Figure 1:
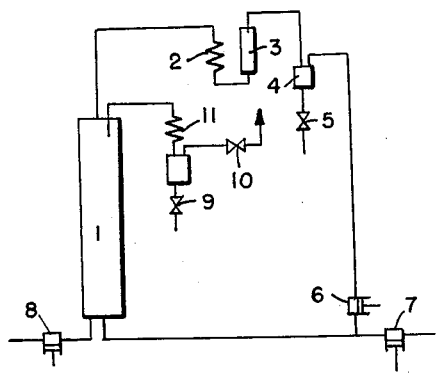

Oct. 23, 1962

H. HOHENSCHUTZ 3,060,233

PRODUCTION OF ACETIC ACID

Filed Aug. 17, 1959

*INVENTOR:*
HEINZ HOHENSCHUTZ
BY

ATT'YS 3,060,233
PRODUCTION OF ACETIC ACID
Heinz Hohenschutz, Mannheim, Germany, assignor to Badische Anilin- & Soda-Fabrik Aktiengesellschaft, Ludwigshafen (Rhine), Germany
Filed Aug. 17, 1959, Ser. No. 834,065
Claims priority, application Germany Aug. 22, 1958
8 Claims. (Cl. 260—532)

This invention relates to an improved process for the production of acetic acid or mixtures of the same with methyl acetate by the continuous carbonylation of methanol, methyl acetate or dimethyl ether or mixtures of two or more of the same.

It is already known that acetic acid is obtained by the reaction of methanol, methyl acetate and/or dimethyl ether with carbon monoxide under pressure at elevated temperature. When starting from methanol or dimethyl ether or mixtures containing the same, the reaction product contains, besides acetic acid, also methyl acetate. The reaction is preferably carried out in the presence of water and with the use as catalysts of metals or metal compounds which form metal carbonyls, or the metal carbonyls themselves. The metals of the iron group of the periodic system or their compounds are especially suitable. When halogen-containing metal compounds are not used, it is moreover necessary to add a halogen or halogen compound advantageous iodine or an iodine compound.

When carrying out the reaction continuously, it is advisable in the interests of the best possible utilization of the carbon monoxide and to avoid losses of entrained valuable substances, mainly acetic acid methyl acetate and methanol, to lead the gas in circulation. The hot gas leaving the reactor is cooled and led back into the reactor. The condensate formed by cooling is also returned to the reactor under the reaction pressure. The entire system is thus under a uniform pressure. The carbon monoxide used up by the reaction is continuously replenished.

In this simplest embodiment of a reaction with gas circulation the fact becomes evident in a troublesome way that during the carbonylation inert gases, including methane and especially carbon dioxide, are formed by side reactions. When working in the said manner, these inert gases become more and more enriched in the circulating gas so that the carbon monoxide partial pressure becomes more and more suppressed and the reaction speed slowed up. In order to avoid this, the content of carbon dioxide and methane in the reaction gas can be kept at a tolerable height by continually removing a part of the reaction gas from the cycle as waste gas.

In this way, however, besides the carbon monoxide contained in the waste gas, considerable amounts of entrained reactants and reaction products are lost. This waste can be avoided by bringing the circulating gas, which has been decompressed to a pressure of 5 to 50 atmospheres, into contact with a solvent which preferentially dissolves carbon dioxide and methane, again compressing the gas thus purified to the reaction pressure, which preferably amounts to 200 to 700 atmospheres, and returning it to the reactor. A disadvantage of working in this way resides in the fact that a considerable expenditure of energy is required for the compression of the purified decompressed gas to the reaction pressure and for the compression of the washing liquid. Moreover, the washing liquid must be separately worked up for the recovery of the valuable substances contained therein.

It has therefore been desirable to find a process according to which, in the continuous production of acetic acid by carbonylation of methanol, methyl acetate and/or dimethyl ether, the content of inert gases in the circulated carbon monoxide can be kept low with the lowest possible expenditure and with the smallest possible waste of valuable substances.

I have now found that acetic acid or mixtures of the same with methyl acetate can be advantageously obtained by the known continuous carbonylation of methanol, methyl acetate or dimethyl ether by cooling the whole of the gas leaving the reactor under the reaction pressure, bringing it into intensive contact under the same pressure or a slightly lower pressure with liquid reaction products as a washing liquid, separating the purified gas from the washing liquid and returning it to the reactor and decompressing the washing liquid, whereby a gas rich in carbon dioxide escapes. The liquid reaction product is intended to include on the one hand the condensate obtained by cooling from the gas escaping from the reactor and on the other hand the product which is withdrawn from the reactor directly in liquid phase. The said condensate, after decompression, is either returned to the reactor or combined with the product which has been withdrawn directly in liquid phase from the reactor. Acetic acid and methyl acetate are then recovered by distillation and the methyl acetate if desired return to the process.

An essential feature of the new method of working resides in the fact that the gas and washing liquid are brought into contact with each other in the cold. When they are hot, relatively little carbon dioxide is dissolved. Thus, for example, a reaction product which is brought into contact at 200° C. with a rection gas having a carbon dioxide content of 10%, yields upon pressure release a gas with a carbon dioxide content of 16%. On the contrary, if the gas and liquid are mixed at room temperature, the resultant gas contains more than 40% of carbon dioxide. The exact content depends on the degree of approximation to the equilibrium position of the distribution of carbon dioxide between the gas and liquid phase. For this reason it is recommendable to provide measures for the good thorough mixing of the gas and liquid if only the condensate from the circulating gas is used for the washing out step, because this is at first not even approximately saturated with carbon dioxide and methane. An intense, thorough mixing can be achieved in the simplest case by allowing the gas to bubble through a spiral tube filled with the liquid. Towers provided with filler bodies, bell trays or perforated trays are more efficient. The thorough mixing may, however, also be achieved in any other apparatus customary in the art in co- or counter-current.

As a rule, the circulating gas is brought into intimate contact with the condensate from the circulating gas or with the reaction product withdrawn in liquid phase, under an equal pressure to that under which the carbonylation has taken place. In many cases however (see FIGURE 3 of the accompanying drawings) it is necessary to work under a pressure which is slightly lower than the pressure in the carbonylation reactor. A pressure is recommended which is less by only up to 10 atmospheres. Pressures are however possible which are up to about 30 atmospheres less than the pressure in the carbonylation reactor. Still lower pressures are not recommended because in this case the compression of the circulating gas upon its re-introduction into the carbonylation reactor can no longer be carried out by a single stage pump.

The gas treated in this way is introduced by means of the circulatory gas pump together with the initial material or separately into the lower part of the reactor after the carbon monoxide used up has been replaced by fresh through a compressor.

The washing liquid is decompressed and allows a gas rich in carbon dioxide and methane to escape. For the removal of the inert constituents it is thus necessary to withdraw less gas than in the method in which the inert gas level in the reactor is regulated solely by withdrawal of waste gas. Consequently, smaller amounts of carbon monoxide and reaction products are lost. As compared with the manner of operation according to which the circulating gas is purified by washing under reduced pressure, there is the advantage that there is no need for a renewed compression of the gas. Similarly it is not necessary to compress the washing liquid and work it up for recovery of valuable materials.

If it is desired to recover the valuable materials from the waste gas rich in carbon dioxide and methane, for example by washing with a suitable solvent, considerably less expenditure for apparatus and energy is required than in the method in which a washing of the entire circulating gas at reduced pressure is provided. A part of the carbon monoxide set free by decompressing the washing liquid may be utilized for the reaction by carrying out the decompression in fractions and returning the fraction rich in carbon monoxide, which escapes first, to the reactor.

Obviously it is also possible to utilize the whole of the carbon monoxide in the gas by removing the carbon dioxide in known manner, for example by washing with water under pressure, and returning to the carbonylation reactor the remaining gas rich in carbon monoxide.

When only the circulating gas condensate is used as the washing liquid, this may be returned to the reactor either with the initial material or separately, or it may be worked up together with the reaction product which has been withdrawn in liquid phase. The latter is possible because the composition of the circulating gas condensate is similar to that of the said liquid phase product.

When the process is directed to the production of acetic acid alone, the methyl acetate arising from the distillation is preferably returned to the reactor with the initial materials.

Figure 2:
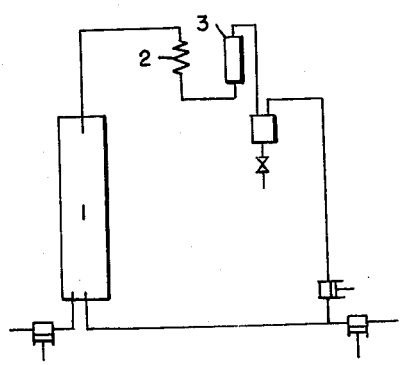
Figure 3:
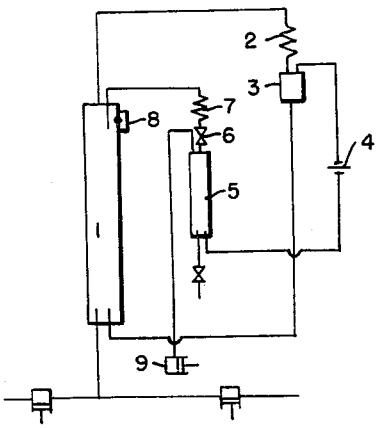

Reference will now be made to the accompanying drawings in which FIGURES 1, 2 and 3 show schematically different embodiments of apparatus in which the process according to this invention may be carried out.

Referring first to FIGURE 1, the condensate formed by cooling the circulating gas to room temperature in a cooler 2 is brought into contact intensively with the circulating gas in a washer 3. The washer consists of a spiral tube in which the gas bubbles through the liquid. The gas and liquid are separated in a separator 4. The liquid is decompressed through a valve 5 and distilled together with the reaction product withdrawn in liquid phase or introduced with the liquid initial materials through a supply pipe 8 into the reactor 1. The gas is returned by means of a circulatory pump 6 into the reactor 1 and the carbon monoxide used up is replenished through a compressor 7. The reaction product is withdrawn at the upper end of the reactor 1, cooled in a cooler 11 and decompressed through a valve 9. In the method of operation according to FIGURE 1, only the circulating gas condensate is available for washing. In this way it is not possible to remove as much inert gas from the circulating gas as is necessary for the maintenance of the desirable carbon monoxide concentration. Therefore part of the gas leaving the reactor with the reaction product must be decompressed through a throttle valve 10 and removed from the process.

In a second, especially simple embodiment, shown in FIGURE 2, a separate outlet for the product is dispensed with. Rather, the reaction product is withdrawn from the reactor 1 with the circulating gas, cooled to room temperature in the cooler 2 and brought intensively into contact with the gas in the washer 3 which again consists of a spiral tube. The gas and liquid are again separated, the reaction product being decompressed and distilled while the circulating gas is returned to the reaction. Since when working in this way the gas is brought into contact with the discharged product and with the circulating gas condensate, it is not necessary to withdraw additional gas in order to reduce the content of inert constituents in the reaction gas to the desirable degree.

A somewhat more complicated but more efficient apparatus in shown in FIGURE 3. The circulating gas, as in the first embodiment, is withdrawn from the reactor 1 separately from the reaction product, cooled in the cooler 2 and separated from condensate in the separator 3. The condensate flows back into the reactor while the circulating gas is decompressed through a throttle valve 4 by 5 to 10 atmospheres and brought into contact in countercurrent with the reaction product in the washing tower 5. The reaction product can be withdrawn through a valve 6 because the pressure in the washer is somewhat less than in the reactor. The reaction product is cooled in a cooler 7 before it enters the washer. A level indicator 8 makes it possible to check the level in the reactor. The gas leaving the washer is compressed again to the reaction pressure by a circulatory gas pump 9 and introduced into the reactor with the initial material or separately.

The conditions under which the actual carbonylation reaction is carried out are already known. It is preferable to use as catalysts iron and especially cobalt and nickel carbonyls. Instead of the carbonyls there may also be used the metals and their salts, especially the halides and, of these, advantageously the iodides, and also the salts of lower aliphatic fatty acids, preferably the acetates. Of the halogens or halogen compounds it is advantageous to use iodine or iodine compounds, but bromine or bromine compounds may well be used. Of the compounds of the said halogens, the hydrogens halides and the alkyl and aryl halides are preferred. The carbonylation is carried out at temperatures between 150° and 300° C. Preferred temperature ranges are 200° to 240° C. when using cobalt catalysts and 250° to 300° C. when using nickel catalysts. The process is advantageously carried out under a pressure of between 200 and 700 atmospheres. At lower pressures than these, the reaction proceeds too slowly, and at higher pressures than these, considerable amounts of liquid products are removed from the carbonylation reactor by the highly compressed gas.

The advantages of the new method of operation will be seen by a comparison of the following Example 1 in which the inert gas content is regulated merely by withdrawal of waste gas from the circulating gas, with Examples 2 and 3 in which the new process is used. The invention is however not limited to Examples 2 and 3.

*Example 1*

Figure 4:
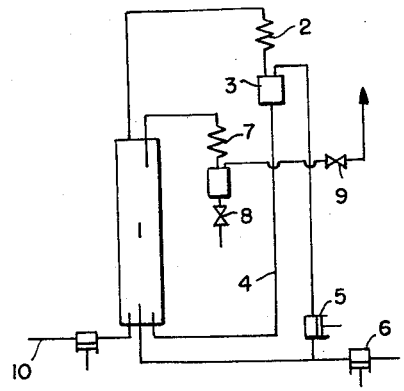

Referring to FIGURE 4, 130 kilograms of a mixture of 75% of methanol, 23% of water, 1.3% of iodine and 0.5% of cobalt (as acetate) are pumped through the supply pipe 10 into the reactor 1 of a high pressure plant which is 8 meters long and has a diameter of 340 millimeters. At the same time there is continually forced in such an amount of carbon monoxide that the pressure amounts to about 500 atmospheres. The temperature is kept at 210° C. The gas escaping from the reactor is cooled in the cooler 2. In the separator 3, the condensate formed is separated from the gas and then returned without intermediate decompression through the pipe 4 into the reactor. The circulating gas is again led into the reactor with the aid of the circulatory gas pump 5. The reaction product is withdrawn from the upper part of the reactor, cooled in a cooler 7 and decompressed through a valve 8. Each hour there are obtained 175 kilograms of a mixture which contains 40% of acetic acid and 23% of methyl acetate. The acid and its ester are recovered by distillation.

The circulatory gas pump 5 conveys 150 normal cubic meters of gas per hour. The pressure is maintained by the supply of fresh carbon monoxide through a compressor 6. The carbon dioxide content of the circulating gas amounts to 10%; in order to maintain it, there are withdrawn per hour, through a throttle valve 9, 50 normal cubic meters of gas containing 16% of carbon dioxide and 77% of carbon monoxide.

Example 2

The apparatus used corresponds to FIGURE 1 and the same amounts are used as in Example 1. The reaction pressure and the temperature are also the same as in Example 1. The condensate from the circulating gas amounts to about 100 liters per hour and after decompression is returned with the supply to the reactor. By decompression, 11 normal cubic meters of waste gas containing 44% of carbon dioxide escape per hour. In order to keep the carbon dioxide content of the circulating gas at 10%, there must moreover be withdrawn through the throttle valve 10, 17 normal cubic meters of waste gas per hour. This contains 19% of carbon dioxide and 75% of carbon monoxide. Therefore a total of 28 normal cubic meters of waste gas escape per hour.

There are obtained per hour 178 kilograms of a mixture which contains 41% of acetic acid and 23% of methyl acetate. The acid and its ester are recovered by distillation.

Example 3

The apparatus shown in FIGURE 2 is used. The amounts of initial material, the pressure and the temperature are the same as in Example 1.

There are obtained per hour 183 kilograms of a mixture which contains 39% of acetic acid and 25% of methyl acetate. As a waste gas there escape per hour 18 normal cubic meters with a content of 45% of carbon dioxide and 35% of carbon monoxide. The carbon dioxide content in the circulating gas is again 10%.

I claim:

1. In a process for the production of acetic acid by the interaction of carbon monoxide and methanol in a reaction zone in the presence of a carbonyl of a metal of the iron group of the periodic system and a substance selected from the group consisting of bromine, iodine and compounds of said halogens under a pressure of 200 to 700 atmospheres and at a temperature between 150° and 300° C., the improvement of: cooling substantially all of the gas escaping from said reaction zone, said gas containing carbon dioxide as an inert impurity; bringing the cooled gas into contact with the liquid reaction products containing acetic acid and methyl acetate as washing liquid under a pressure in a range of between about the reaction pressure and a pressure 30 atmospheres less than the reaction pressure, thereby transferring carbon dioxide from said gas into said washing liquid; separating the purified gas from the washing liquid; returning the purified gas to the reaction zone; decompressing said washing liquid to remove therefrom a gas containing carbon dioxide; separating the methyl acetate from the liquid reaction products; and returning said methyl acetate to the reaction zone.

2. In a process for the production of acetic acid by the interaction of carbon monoxide and a compound selected from the group consisting of methanol, methyl acetate, dimethyl ether, and mixture thereof in a reaction zone in the presence of a carbonyl of a metal of the iron group of the periodic system and a substance selected from the group consisting of bromine, iodine and compounds of said halogens under a pressure of 200 to 700 atmospheres and at a temperature between 150° and 300° C., the improvement of: cooling substantially all of the gas escaping from said reaction zone, said gas containing carbon dioxide as an inert impurity; bringing the cooled gas into contact with the liquid reaction products as washing liquid under a pressure in a range between the reaction pressure and a pressure 30 atmospheres less than the reaction pressure, thereby transferring carbon dioxide from said gas into said washing liquid; separating the purified gas from the washing liquid; returning the purified gas to the reaction zone; and decompressing said washing liquid so as to remove therefrom a gas containing carbon dioxide.

3. A process as claimed in claim 2 wherein carbon dioxide is further separated from the gas obtained by decompressing said washing liquid and the remaining gas is subsequently returned to the reaction zone.

4. A process as claimed in claim 2 wherein the washing liquid is the condensate of the liquid reaction products obtained by cooling the gas escaping from said reaction zone.

5. A process as claimed in claim 2 wherein the washing liquid is the reaction product withdrawn directly in liquid phase from the reaction zone.

6. A process as claimed in claim 2 wherein the washing liquid is a combination of both the condensate of the liquid reaction product obtained by cooling the gas escaping from the reaction zone and also the product withdrawn directly in liquid phase from the reaction zone.

7. A process as claimed in claim 2 wherein the gas is brought into countercurrent contact with the liquid reaction product in an elongated washing zone.

8. A process as claimed in claim 2 wherein the washing liquid is decompressed in stages and the first fraction of the decompressed gas, which is rich in carbon monoxide, is returned to said reaction zone.

References Cited in the file of this patent

UNITED STATES PATENTS

| 1,940,987 | Woodhouse | Dec. 26, 1933 |
| 1,961,737 | Carlin et al. | June 5, 1934 |

OTHER REFERENCES

Reppe: "Acetylene Chemistry," P.B. Report 18852–S, 1949, pp. 171–173.